(12) United States Patent
Lortz et al.

(10) Patent No.: US 9,268,545 B2
(45) Date of Patent: Feb. 23, 2016

(54) CONNECTING MOBILE DEVICES, INTERNET-CONNECTED HOSTS, AND CLOUD SERVICES

(75) Inventors: Victor B. Lortz, Beaverton, OR (US); Anand P. Rangarajan, Beaverton, OR (US); Somya Rathi, Portland, OR (US); Vijay Sarathi Kesavan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/134,064

(22) Filed: May 27, 2011

(65) Prior Publication Data

US 2012/0252405 A1    Oct. 4, 2012

Related U.S. Application Data

(63) Continuation-in-part of application No. 13/065,840, filed on Mar. 31, 2011, now Pat. No. 9,032,493.

(51) Int. Cl.
| | |
|---|---|
| *G06F 15/16* | (2006.01) |
| *G06F 9/445* | (2006.01) |
| *H04W 4/00* | (2009.01) |
| *H04L 29/08* | (2006.01) |
| *H04L 29/06* | (2006.01) |

(52) U.S. Cl.
CPC *G06F 8/60* (2013.01); *H04L 63/08* (2013.01); *H04L 67/34* (2013.01); *H04W 4/001* (2013.01); *H04L 63/0492* (2013.01); *H04L 63/18* (2013.01); *H04L 67/12* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 6,405,033 B1 | 6/2002 | Kennedy, III et al. |
| 7,161,464 B2 | 1/2007 | Yuhara |
| 7,181,620 B1 | 2/2007 | Hur |
| 7,801,507 B2 | 9/2010 | Benco et al. |
| 8,222,989 B2 | 7/2012 | Ziska et al. |
| 8,258,934 B2 | 9/2012 | Filev et al. |
| 2002/0135466 A1 | 9/2002 | Bunyan |
| 2004/0185842 A1 | 9/2004 | Spaur et al. |
| 2004/0210757 A1 | 10/2004 | Kogan et al. |
| 2005/0065678 A1 | 3/2005 | Smith et al. |
| 2006/0184531 A1 | 8/2006 | Russlies |
| 2007/0075848 A1 | 4/2007 | Pitt |
| 2007/0075849 A1 | 4/2007 | Pitt |
| 2007/0079113 A1 | 4/2007 | Kulkarni et al. |

(Continued)

FOREIGN PATENT DOCUMENTS

| | | |
|---|---|---|
| CN | 101855861 A | 10/2010 |
| JP | 2007-034765 A | 2/2007 |

(Continued)

OTHER PUBLICATIONS

International Search Report and Written Opinion received for PCT Patent Application No. PCT/US2011/066800, mailed on Sep. 3, 2012, 9 pages.

(Continued)

*Primary Examiner* — John B Walsh
(74) *Attorney, Agent, or Firm* — Forefront IP Lawgroup, PLLC

(57) ABSTRACT

Applications are downloaded to a device from a cloud-based service by establishing trust with between the device and a host system. The host system and the cloud-based service have a pre-existing trust relationship.

31 Claims, 5 Drawing Sheets

(56) References Cited

U.S. PATENT DOCUMENTS

| | | | |
|---|---|---|---|
| 2007/0178882 A1 | 8/2007 | Teunissen et al. | |
| 2008/0148374 A1 | 6/2008 | Spaur et al. | |
| 2008/0150683 A1 | 6/2008 | Mikan et al. | |
| 2009/0248232 A1 | 10/2009 | Sennett et al. | |
| 2010/0037057 A1 | 2/2010 | Shim et al. | |
| 2010/0077446 A1 | 3/2010 | Umezawa et al. | |
| 2010/0088367 A1* | 4/2010 | Brown et al. | 709/203 |
| 2010/0094996 A1 | 4/2010 | Samaha | |
| 2010/0241857 A1* | 9/2010 | Okude et al. | 713/168 |
| 2010/0284382 A1 | 11/2010 | Stahlin et al. | |
| 2010/0287038 A1 | 11/2010 | Copejans | |
| 2011/0151795 A1 | 6/2011 | D'Avello et al. | |
| 2011/0191581 A1 | 8/2011 | Shim et al. | |
| 2011/0209064 A1* | 8/2011 | Jorgensen et al. | 715/733 |
| 2011/0237287 A1 | 9/2011 | Klein et al. | |
| 2011/0264916 A1 | 10/2011 | Fischer et al. | |
| 2011/0277027 A1* | 11/2011 | Hayton et al. | 726/8 |
| 2012/0060030 A1 | 3/2012 | Lamb | |
| 2012/0062392 A1 | 3/2012 | Ferrick et al. | |
| 2012/0100806 A1 | 4/2012 | Hall | |
| 2012/0197523 A1 | 8/2012 | Kirsch | |
| 2012/0203399 A1 | 8/2012 | Filev et al. | |
| 2012/0219142 A1 | 8/2012 | Gould | |
| 2012/0297458 A1 | 11/2012 | Tom | |

FOREIGN PATENT DOCUMENTS

| | | |
|---|---|---|
| TW | I369112 B | 7/2012 |
| WO | 2012/134571 A1 | 10/2012 |

OTHER PUBLICATIONS

Office Action received for U.S. Appl. No. 13/065,840, mailed on Sep. 28, 2012, 17 pages.

Office Action received for U.S. Appl. No. 13/065,840, mailed on Mar. 27, 2013, 23 pages.

Office Action received for Taiwan Patent Application No. 100148365, mailed on Apr. 22, 2014, 11 pages of English Translation and 12 pages of Taiwan Office Action.

Final Office Action received for U.S Appl. No. 13/065,840, mailed on Apr. 17, 2014, 39 pages.

Office Action received for U.S. Appl. No. 13/065840, mailed on Sep. 27, 2013, 33 pages.

Umezawa et al., "A Study on User Authentication Infrastructure for Next Generation Telematics", Proceedings of the 2008 IEEE International Conference on Vehicular Electronics and Safety, Sep. 22-24, 2008, pp. 38-44.

International Preliminary Report on Patentability and Written Opinion received for PCT Application No. PCT/US2011/066800, mailed on Oct. 10, 2013, 6 pages.

Office Action received for Japanese Patent Application No. 2014-502548, mailed on Jun. 3, 2014, 6 pages of Office Action including 3 pages of English Translation.

Umezawa et al., "A Study on User Authentication Infrastructure for Telematics", The Institute of Image Information and Television Engineers, Apr. 28, 2008, pp. 133-138.

Extended European Search Report received for European Patent Application No. 11862752.0, mailed on Sep. 3, 2014, 6 pages.

Supplementary European Search Report received for European Patent Application No. 11862752.0, mailed on Sep. 19, 2014, 1 page.

Office Action received for Korean Patent Application No. 10-2013-7025246, mailed on Nov. 26, 2014, 7 pages of English Translation and 7 pages of Korean Office Action.

Office Action received for Japanese Patent Application No. 2014-502548, mailed on Oct. 21, 2014, 3 Pages of English Translation and 3 Pages of Japanese Office Action.

Notice of Allowance received for U.S. Appl. No. 13/065,840, mailed on Jan. 9, 2015, 21 pages.

* cited by examiner

US 9,268,545 B2

CONNECTING MOBILE DEVICES, INTERNET-CONNECTED HOSTS, AND CLOUD SERVICES

RELATED APPLICATION

This application is a continuation-in-part of and claims priority to U.S. patent application Ser. No. 13/065,840, filed on Mar. 31, 2010, and entitled "Connecting Mobile Devices, Internet-connected Vehicles, and Cloud Services."

BACKGROUND

The Internet has allowed users to access and use various web services. Traditionally, such access to these services was through the use of computers. However, access to the Internet has progressed to other devices, such as mobile devices, including smart phones. Technology progresses allowing other devices, appliances, and platforms to access the Internet. In particular, such a platform includes automotive vehicles.

Cloud-based services are certain Internet services available to users. In cloud-based services, computing or processing can take place at various physical and virtual servers (i.e., computing devices) that are not particularly known by a user. To the user, the cloud-based service is performed somewhere on the Internet. Where the service is physically performed, the user does not know or necessarily care to know. Cloud computing allows a device to free itself of certain processing, including accessing data and performing tasks related to the cloud-based service.

It is possible to implement applications on mobile devices that control and obtain status information from other devices through a cloud-based service. One such usage scenario is to connect a mobile device to an Internet-connected host or host system, such as a personal computer (PC), a television (TV), set top box, another mobile device, or a vehicle, through a cloud-based service.

Furthermore, properly downloading applications to a mobile device, and authenticating the mobile device to access the host, can be problematic. An application may include executable software and/or data. In certain cases, an application may be used to access and control a host system through the mobile device. In many instances, a user performs multiple steps to properly download, install, and configure an application to a mobile device.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Downloading software applications to a mobile device can involve multiple steps and properly determining the correct application to install on the mobile device. In certain cases, an application includes providing security to access and control a host system.

Overview

Described herein are devices and methods for downloading applications to a mobile device, including a smart phone, such that the correct installation is performed, and minimal user interaction is involved. In particular, the mobile device can securely connect to and/or control an Internet-connected host system, and download proper applications and security configuration through a cloud-based service.

Example System Environment

Figure 1:
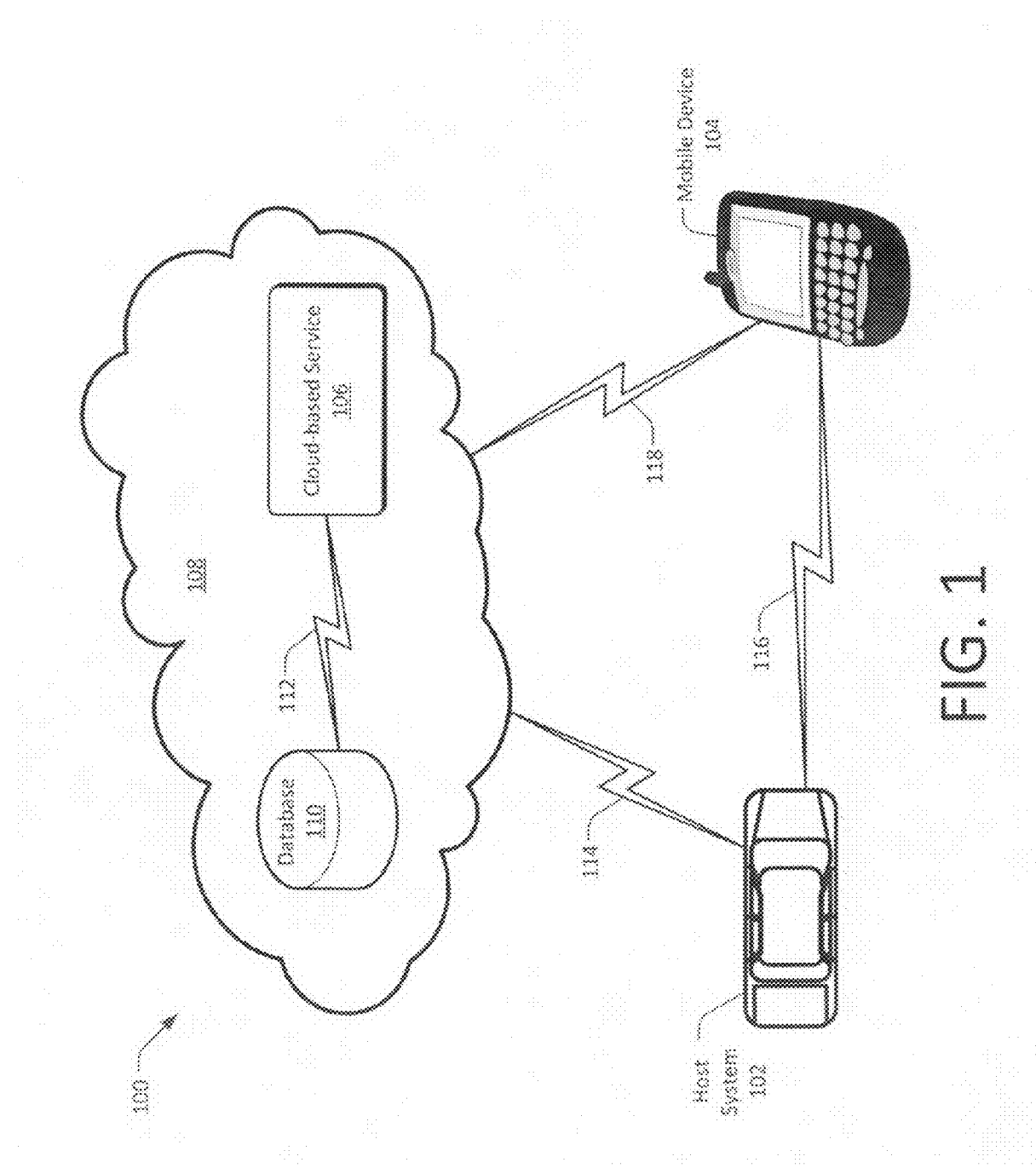
FIG. 1 is a block diagram of an example system architecture to connect a mobile device, an Internet-connected host, and a cloud-based service according to some implementations.

FIG. 1 illustrates a system-level overview of an exemplary system environment 100 for connecting an Internet-connected host system/network or host system 102, a mobile device 104, and a cloud-based service 106. The system environment 100 may include the host system 102, a mobile device computing system or mobile device 104 and a cloud-based service 106. Host system 102 can include different networks, such as a home or business network. For example, a home network can include various appliances and devices which include multimedia that the mobile device 104 can access. In this example, a vehicle system or vehicle is described in reference to host system 102; however, it is to be understood that other systems and networks may be implemented. Reference to host system 102 herein may include a vehicle computing system and a physical automotive vehicle in which the vehicle computing system resides.

The cloud-based service 106 can be part of the Internet as represented by cloud 108. Cloud-based service 106 can be part of an example cloud computing architecture that includes a front end component (not shown) and a back end component (not shown). The front end component is seen by a client, such as the host system 102. In certain implementations, host system 102 and applications resident on host system 102 access the cloud-based service 106 through a user interface, such as a web browser. The back end component of the example cloud computing architecture can include various computers, services and data storage devices.

A database 110 is accessed by cloud-based service 106 through a connection 112. The database 110 can be an authentication and authorization database. The database 110 can also include applications, security keys and certificates, etc. to be accessed and downloaded to host system 102 and mobile device 104. Examples of information stored in database 110 include data specific to host system 102, such as "Client ID" of the mobile device 104; "role" of the mobile device 104 (i.e., Owner or Guest); and "Credential Information" allowing the mobile device 104 to access the cloud-based service 106.

In certain implementations, a digital certificate for host system 102 may be issued at the time of, or subsequently after, establishing (i.e., manufacturing) of the host system 102 to establish a trust relationship between the host system 102 and cloud-based service 106. The digital certificate can be stored in secure memory of the host system 102. In addition, another digital certificate can be issued for the cloud-based service 106, allowing the host system 102 to identify and trust the cloud-based service 106. Therefore, the digital certificates can be used to protect communication between the host system 102 and cloud-based service 106. It is to be understood that credential types besides certificates can be used. For example, a shared secret can be used between the host system 102 and the cloud-based service 106. In certain implementations, the host system 102 can use a smart card such as a subscriber identity module (SIM) for authentication.

In order to access the cloud-based service 106, the host system 102 can include information as to a uniform resource locator or URL of the cloud-based service 106. A connection 114 between the host system 102 and cloud-based service 106 can be through various technologies, including International Mobile Telecommunications standard or cellular 3G/4G (or a future variant), WiFi (i.e., IEEE 802.11), or WiMax (i.e., IEEE 802.16) access. Such access may be through a wireless 3G/4G modem or other wireless interface. A secure connection 114 can be established using a variety of different protocols. An example protocol is Extensible Messaging and Presence Protocol or XMPP; however, it is to be understood that other protocols can be used. XMPP can be an efficient protocol which can also support the secure sockets layer (SSL) or transport layer security (TLS) protocol. SSL and TLS protocols can provide communication privacy and authentication based on the digital certificates of host system 102 and cloud-based service 106.

A local communication or a connection 116 can be established between the host system 102 and mobile device 104. The connection 116 can include near field communication (NFC) for very short range communication, and Bluetooth and/or WiFi for longer range communication. To assure security and establish a trust relationship between the host system 102 and mobile device 104, there may be a condition to have the mobile device 104 be physically within the environment of the host system 102.

The mobile device 104 may include a setup application used to establish a preliminary connection with the host system 102. The setup application may be preinstalled or downloaded into the mobile device 104. A local pairing may be performed between the host system 102 and mobile device 104. For example, such a pairing may be implemented using a WiFi Protected Setup (WPS) or NFC connection handover. Alternatively, the host system 102 may provide a uniform resource locator (URL) via a local communication channel such as a quick response (QR) code shown on a display of the host system 102 or via an NFC NDEF (NFC data exchange format) URL record. Such a URL may be processed using the functionality provided by a web browser of the mobile device 104, enabling initial download of an application or setup application over an connection 118 (e.g., Internet connection). This initial download may also include information to allow the mobile device 104 to establish a local connection 116 to the host system 102.

During establishment of the local connection, a local or an out of band channel is implemented in order to establish security between the host system 102 and mobile device 104. Exchanging secret information through the out of band channel can prevent other mobile devices (i.e., attackers) within the range of the local connection from connecting to the host system 102. As an example, such out of band methods may include one or more of the following: NFC touch (i.e., exchange of NFC data through an NFC interface); infrared, QR code; bar code identification (e.g., the mobile device 104 reading a 1-D (one dimensional) or 2-D (two dimensional) bar code that is displayed on a screen/display of the host system 102); accelerometer "bump"; a time-limited push-button configuration; and/or a personal identifier number or PIN entered by the user.

To establish a trust relationship between the host system 102 and mobile device 104, certain out of band data is transferred from the host system 102 to the mobile device 104 through use of one or more of the out of band methods. Out of band data may allow the mobile device 104 to connect with host system 102, and determine the cloud-based service 106 that supports the host system 102. In addition, the out of band data may establish that the mobile device 104 has actually read the out of band data, thus verifying the mobile device 104. Out of band data may include a secret for the purpose of setting up an initial trust between the host system 102 and mobile device 104, and may include a temporary setup ID and URL that the mobile device 104 uses to download an application from an application store or directly from the cloud-based service 106.

Once the mobile device 104 receives the out of band data, the mobile device 104 may receive data, including a uniform resource locator or URL as to the configuration of wireless communication of host system 102. Configuration information may include whether the host system 102 has a built in WiFi access point, if the host system 102 supports direct peer to peer WiFi, etc. For example, if the mobile device 104 finds out details of the wireless connection to the host system 102, a port number can be received by the mobile device 104 through the out of band channel (data) as to set up services for mobile devices of the host system 102. In addition, other data may be received by the mobile device 104, such as, for example, a software version number. Other data may allow the mobile device 104 to determine if the mobile device 104 can support the introduction/connection to the host system 102.

In certain implementations, the mobile device 104 use the received URL to access the cloud-based service 106, download and install an application(s), send browser identification information to the cloud-based service 106. In certain cases, the mobile device 104 may be redirected to receive a corrected pre-configured application.

Once out of band exchange is performed, the mobile device 104 may connect to the host system 102 using a local wireless network link such as, for example, Bluetooth or WiFi. After the local wireless connection is established, the mobile device 104 may receive an authenticated and encrypted payload from the vehicle 104 that contains configuration data including the URL of the cloud-based service 106, a host system 102 identifier, and a client credential (e.g., client identifier and shared secret or client certificate) for future use with the cloud-based service 106. The client credential may be used to establish access rights of the mobile device 104 to the cloud-based service 106.

As an example, access rights of the mobile device 104 with the cloud-based service 106 can be established by the following. The host system 102 determines access rights by presenting various options through a display/touch screen or voice interface (i.e., microphone and speakers). The host system 102 may provide a prompt on a display of the host system 102, requesting the owner (i.e., user having owner's rights) of the host system 102 to verify that the owner is adding the mobile device 104. For example, an owner may be able to add a guest user and a guest user mobile device. A guest user and a guest user mobile device may have limited access rights and privileges, or full ownership rights and privileges to the host system 102.

Biometric methods, such as face or voice recognition, may be used to determine a user's identity (e.g., owner of host system 102), verify ownership rights and authority to assign access rights to the mobile device 104. If ownership of host system 102 cannot be conclusively established by the host system 102, access rights of the mobile device 104 may be limited to an acceptable low-risk default level or limited set of access rights. In certain implementations, a camera of the host system 102 can perform face recognition to verify ownership of the host system 102. In other implementations, voice recognition may be used to verify ownership of the host system 102. If the user is not recognized as an owner of host system 102, a security policy may be implemented to prevent the mobile device 104 from accessing the host system 102 or provide the mobile device 104 with a limited set of rights and privileges. For example, a limited set of rights and privileges may be allowing access to a local WiFi connection of the host system 102, and preventing turning on/off the alarm of the host system 102. In other implementations, a first mobile device 104 that has previously been granted owner's rights may be used to confirm that the owner intends to add a second mobile device (not shown) with specified access rights.

The mobile device 104 may send proof to the cloud-based service 106 that the mobile device 104 has received a secret (e.g., the authenticated and encrypted payload) from the host system 102 and provide any identifying information that may be needed. The mobile device 104 may provide identity, credential, and access rights over a secure channel (i.e., connection 118) to the cloud-based service 106. The identity or identifying information provided by mobile device 104 may include a readable name that identifies the user or mobile device 104 by name. In certain implementations, a certificate may be given to the mobile device 104 to identify the mobile device 104. In other implementations, a symmetric secret key may be given to the mobile device 104 to identify the mobile device 104. Thereafter, the mobile device 104 can authenticate with the cloud-based service 106 and gain remote access to the host system 102 and/or associated data over the Internet through the cloud-based service 106. Furthermore, the mobile device 104 may verify trust of the cloud-based service 106 by comparing a "server certificate" with a domain name in the URL as provided by the host system 102. Trust between the cloud-based service 106 and the mobile device 104 may use the same protocols and mechanisms as a conventional browser-based secure website implementing e-commerce security.

The exchange of secure configuration data (e.g., the authenticated and encrypted payload) over the out of band channel between the host system 102 and the mobile device 104 can prove to the host system 102 that the mobile device 104 knows the secret. In certain implementations, the secret is not sent by itself, but is used as an input to a cryptographic hash function which is used to prove that the mobile device 104 is the device that received that out of band data (whether through the use of NFC, bar code, etc.). The host system 102 may check and verify the hash, and provide the mobile device 104 configuration information that the mobile device 104 can use to connect to the cloud-based service 106. Such configuration information may include the URL of the cloud-based service 106 and an identifier of the mobile device 104. In certain implementations, a secret may be included which the mobile device 104 uses to log on to the cloud-based service 106.

Once trust is established with the mobile device 104, a secure login between the mobile device 104 and the cloud-based service 106 over connection 118 may occur. The connection 118 may be one of various wireless connections including cellular connections that include 3G/4G (or future variants), and WiFi/WiMax connections.

Therefore, by establishing a secured trust between the host system 102, mobile device 104 and cloud service 106, information between and control of the three entities is protected.

For example, the use of secrets and the passing of such secrets between the host system 102, mobile device 104 and cloud service 106 may prevent phishing attacks such as when the mobile device 104 tries to access what is believed to be the cloud-based service 106. Although a user of the mobile device 104 believes that they are accessing the proper URL, they may be redirected to an attacker's server. However, through the use of a local wireless introduction between the host system 102 and mobile device 104, stronger passwords can be exchanged and an exchange of secrets can be implemented. Passing secrets across a local wireless connection (e.g., connection 116) may also protect against a remote attacker who may be able to compromise part of the setup procedure, but is prevented from obtaining long-term credentials because the remote attacker is not within range of the local wireless network.

Once the three-way trust is established between the host system 102, mobile device 104, and cloud-based service 106, the mobile device 104 can allow a user to access functionality of the host system 102. For example, an application in the mobile device 104 can be activated, and the application may connect to the cloud-based service 106. Information received from the host system 102 during the pairing process, can be used by the application to securely log on to the cloud-based service 106. In certain cases, the mobile device 104 provides an ID to the cloud-based service 106 that associates the mobile device 104 to the host system 102.

The cloud-based service 106 allows the mobile device to log in, and the application running on the mobile device 104 may invoke functions on the cloud-based service 106 to instruct the host system 102 to perform certain tasks/operations. The tasks/operations may be conveyed through communication 114. In the case of a vehicle, examples of tasks and operations may include, as discussed above, turning on/off an alarm of the host system 102. Other tasks may include opening and closing locks of the host system 102. In an example scenario, an alarm may be triggered at the host system 102, and cameras of the host system 102 may record video around the host system 102. The video may then be uploaded from the host system 102 to the cloud-based service 106 for viewing by the mobile device 104. In addition, a short message service or SMS message may be sent to the mobile device 104. The SMS message may include a link that allows the mobile device 104 to connect to cloud-based service 106 and view the video of what happened that set off the alarm (e.g., the host system 102 is being towed, was damage, etc.). Other tasks/operations may include remotely starting the host system 102, determining the amount of fuel in the host system 102, determining the temperature in the host system 102, and locating the host system 102 using a global positioning system or GPS.

Example Internet-Connected Host System

Figure 2:
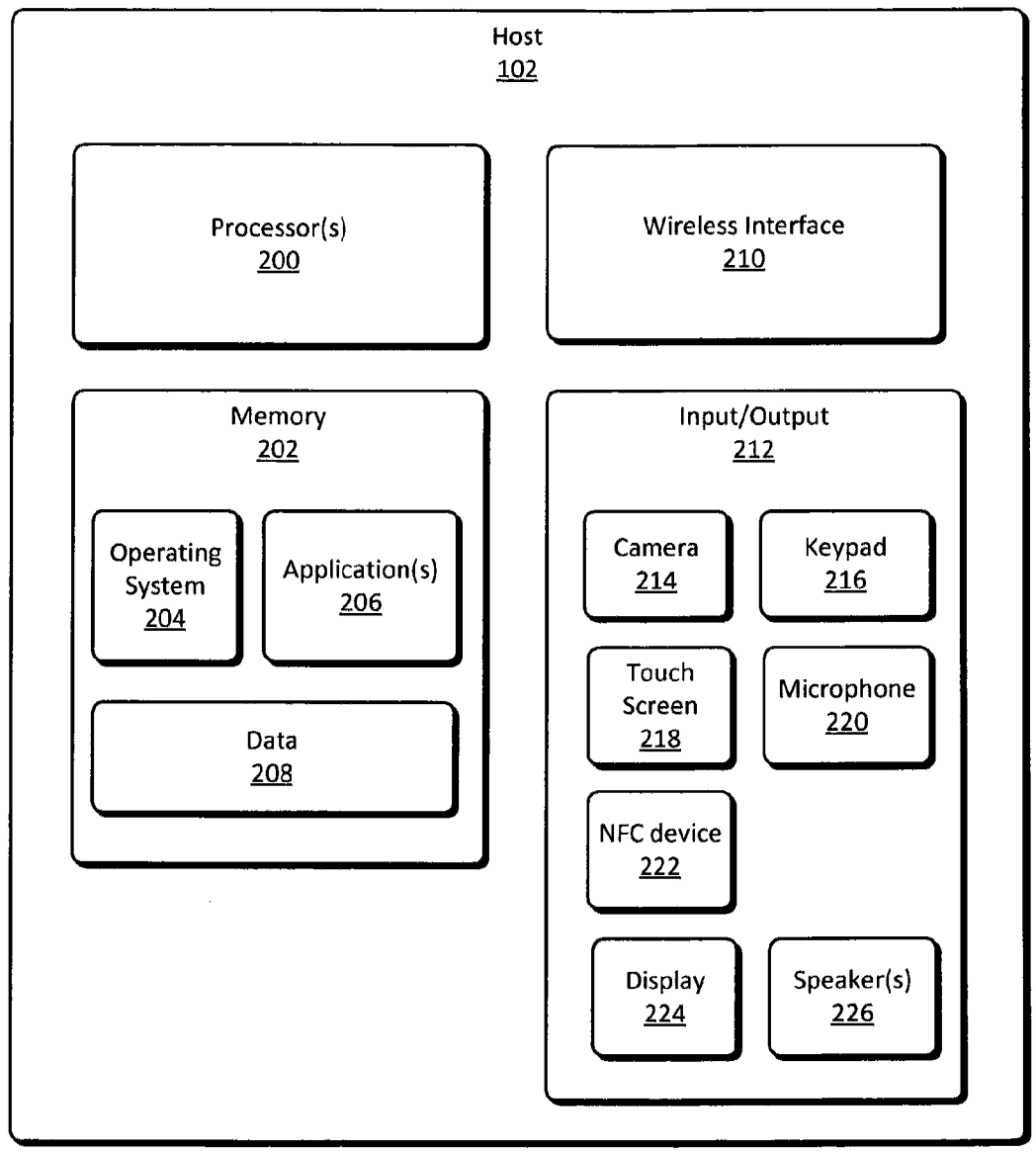
FIG. 2 is a block diagram of an example Internet-connected host system that connects to a mobile device and cloud-based service according to some implementations.

FIG. 2 shows an example Internet-connected host system 102. It is to be understood that host system may include one or more devices, and sub-systems. In this example, host system 102 includes one or more processors, processor(s) 200. Processor(s) 200 may be a single processing unit or a number of processing units, all of which may include single or multiple computing units or multiple cores. The processor(s) 200 may be implemented as one or more microprocessors, microcomputers, microcontrollers, digital signal processors, central processing units, state machines, logic circuitries, and/or any devices that manipulate signals based on operational instructions. Among other capabilities, the processor(s) 200 may be configured to fetch and execute computer-readable instructions or processor-accessible instructions stored in a memory 202 or other computer-readable storage media.

Memory 202 is an example of computer-readable storage media for storing instructions which are executed by the processor(s) 200 to perform the various functions described above. For example, memory 202 may generally include both volatile memory and non-volatile memory (e.g., RAM, ROM, or the like). Memory 202 may be referred to as memory or computer-readable storage media herein. Memory 202 is capable of storing computer-readable, processor-executable program instructions as computer program code that may be executed by the processor(s) 200 as a particular machine configured for carrying out the operations and functions described in the implementations herein.

Memory 202 may include an operating system 204, and may store application(s) 206. The operating system 204 may be one of various known and future operating systems implemented for personal computers, vehicle systems, etc. The applications(s) 206 may include preconfigured/installed and downloadable applications. A web browser may be included in the operating system 204 or be part of application(s) 206. In addition, memory 202 can include data 208. As discussed above, examples of data 208 include "Client ID" of the mobile device 104, "Role" of the mobile device 104, and "Credential Information" and a digital certificate issued at the time of manufacturing (or subsequently) to the host system 102.

The Internet-connected host system 102 may include communication interface(s), and particularly a wireless interface 210, for exchanging data with other devices and networks. The wireless interface 210 may include WiFi, WiMax, NFC, Bluetooth, 3G/4G (or a future variant) cellular communications, etc.

Internet-connected host system 102 includes input/output components/devices or input/output 212. In this example, input/output 212 includes a camera 214, a keypad 216, touch screen 218 and a microphone 220 to receive input, including biometric information (e.g., face, voice, fingerprint, retinal, etc.). Furthermore, input/output 212 may include an NFC device 222 used to perform out of band local pairing between the host system 102 and mobile device 104. NFC device 222 may be hardware that functions as a reader, and includes an identifying "sticker." NFC device 222 can particularly be used for local pairing between the mobile device 104 and the host system 102 as discussed above. Input/output 212 may include output components/devices, such as a display 224 and audio speaker(s) 226.

The example Internet-connected host system 102 described herein is merely an example that is suitable for some implementations and is not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example Mobile Device System

Figure 3:
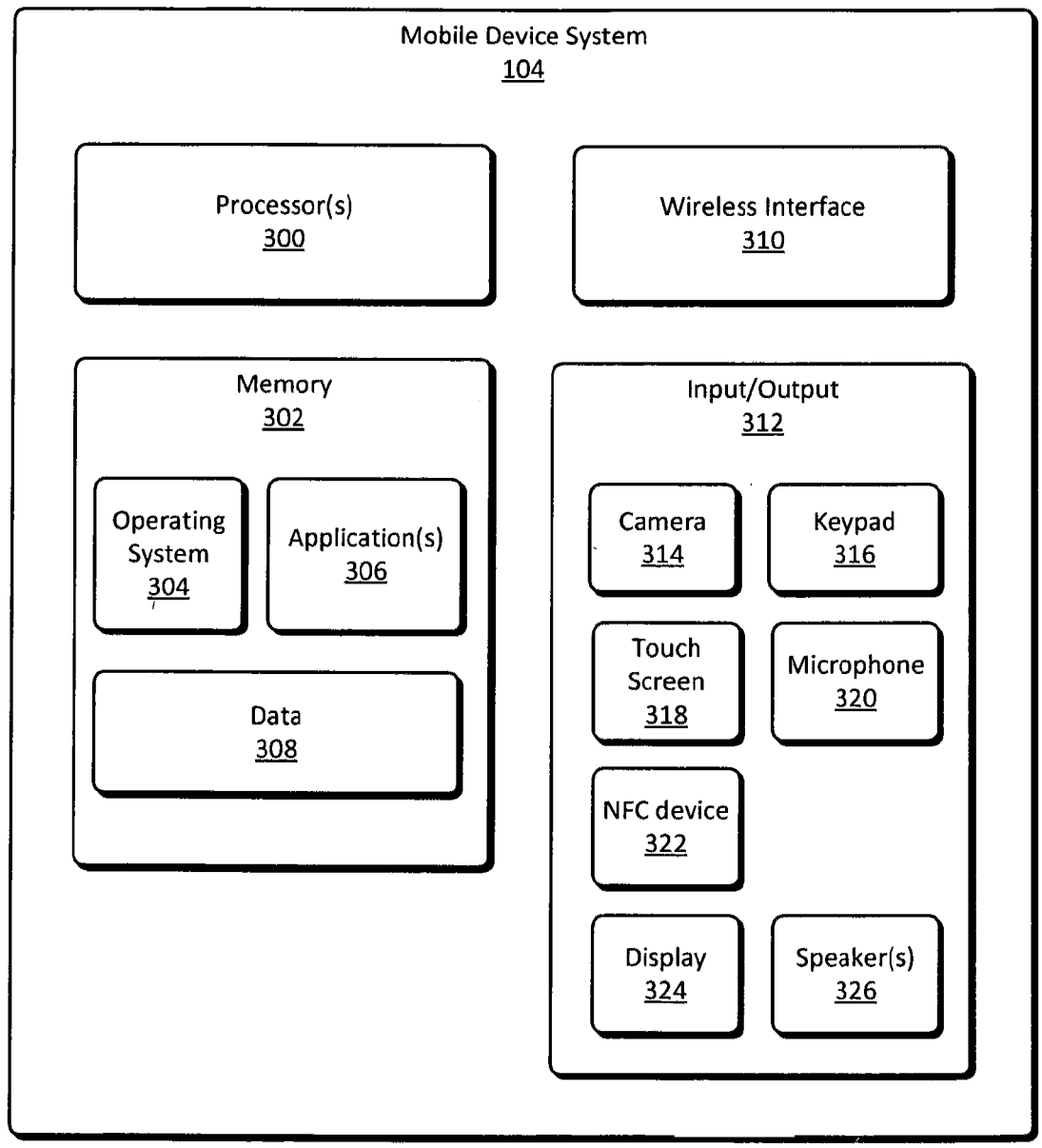
FIG. 3 is a block diagram of an example mobile device that connects to internet-connected host system and cloud-based service according to some implementations.

FIG. 3 shows an example mobile device 104. The mobile device 104 includes one or more processors, processor(s) 300. Processor(s) 300 may be a single processing unit or a number of processing units, all of which may include single or multiple computing units or multiple cores. The processor(s) 300 may be implemented as one or more microprocessors, microcomputers, microcontrollers, digital signal processors, central processing units, state machines, logic circuitries, and/or any devices that manipulate signals based on operational instructions. Among other capabilities, the processor(s) 300 may be configured to fetch and execute computer-readable instructions or processor-accessible instructions stored in a memory 302 or other computer-readable storage media.

Memory 302 is an example of computer-readable storage media for storing instructions which are executed by the processor(s) 300 to perform the various functions described above. For example, memory 302 may generally include both volatile memory and non-volatile memory (e.g., RAM, ROM, or the like). Memory 302 may be referred to as memory or computer-readable storage media herein. Memory 302 is capable of storing computer-readable, processor-executable program instructions as computer program code that may be executed by the processor(s) 300 as a particular machine configured for carrying out the operations and functions described in the implementations herein.

Memory 302 may include an operating system 304. Operating system 304 may be one of various known and future operating systems implemented for mobile devices. The applications(s) 306 may include preconfigured/installed and downloadable applications. Application(s) 306 may include an application to contact and connect with the cloud-based service 106 and the setup application used to establish a preliminary connection with the host system 102. A web browser may be included in the operating system 304 or be part of application(s) 306. Furthermore, data 308 may be stored in memory 302. As discussed above, examples of data 308 include "Client ID" of the mobile device 104, "Role" of the mobile device 104, and "Credential Information" and a digital certificate issued at the time of manufacturing (or subsequently) to the host system 102.

The mobile device system 300 may include communication interface(s), and particularly a wireless interface 310, for exchanging data with other devices and networks. The wireless interface 310 may include WiFi, WiMax, NFC, Bluetooth, 3G/4G (or a future variant) cellular communications, etc.

Mobile device system 300 includes input/output components/devices or input/output 312. In this example, input/output 312 includes a camera 315, a keypad 316, a touch screen 318 and a microphone 320 to receive input, including biometric information (e.g., face, voice, fingerprint, retinal, etc. recognition). Furthermore, in certain implementations, input/output 312 may include a NFC device 322 used to perform out of band local pairing between the host system 102 and mobile device 104. NFC device 322 may be hardware that functions as a reader, and includes an identifying "sticker." NFC device 322 may particularly be used for local pairing (e.g., with NFC device 222) between the mobile device 104 and the host system 102 as discussed above. Input/output 312 may include output components/devices, such as a display 324 and audio speaker(s) 326. The camera 314 may be used to read a QR code provided from the host system 102, where the QR code may include an URL to the cloud-based service 106.

The example mobile device 104 described herein is merely an example that is suitable for some implementations and is not intended to suggest any limitation as to the scope of use or functionality of the environments, architectures and frameworks that may implement the processes, components and features described herein.

Generally, any of the functions described with reference to the figures may be implemented using software, hardware (e.g., fixed logic circuitry) or a combination of these implementations. Program code can be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example Processes

Figure 4:
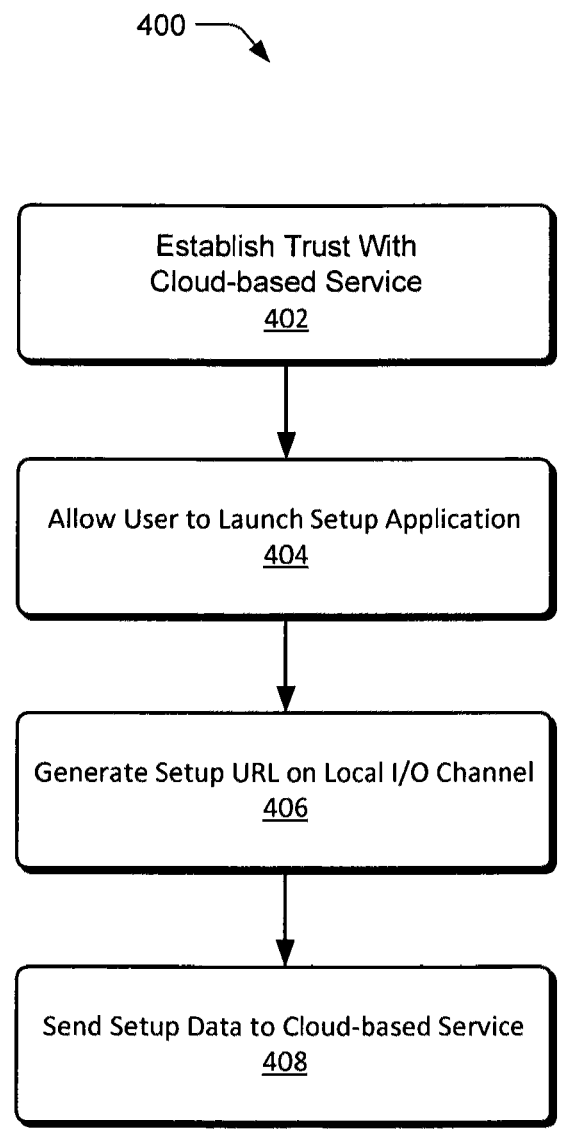
FIG. 4 is a flow chart for performing and establishing a mobile device setup application between a host system and cloud-based service according to some implementations.

FIG. 4 shows a flow chart for an exemplary process 400 for establishing a mobile device setup application between a host system and cloud-based service. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, establishing trust between a host or host system, and a cloud-based service is performed. In the example of a vehicle as a host system, establishing the trust relationship may be part of a vehicle manufacturing process. Establishing the trust relationship may include digital certificates and hardware protection mechanisms implementing a secure boot process with software attestation and hardware-protected key storage, implemented by the vehicle system to maintain integrity of the trust relationship.

At block 404, launching of a setup application by a user is performed. This step may include a user requesting that a mobile device download an application and/or connect to the host system.

At block 406, generating or sending of a URL of the cloud-based service to the mobile device is performed. The sending can be performed through a local or out of band channel between the host system and mobile device. Certain implementations to send the URL can use NFC or a QR code. For example, a QR code that includes the URL can be read by the mobile device.

At block 408, sending setup data to the cloud-based service is performed. This step may include the host system sending a configuration and setup identification the cloud-based service.

Figure 5:
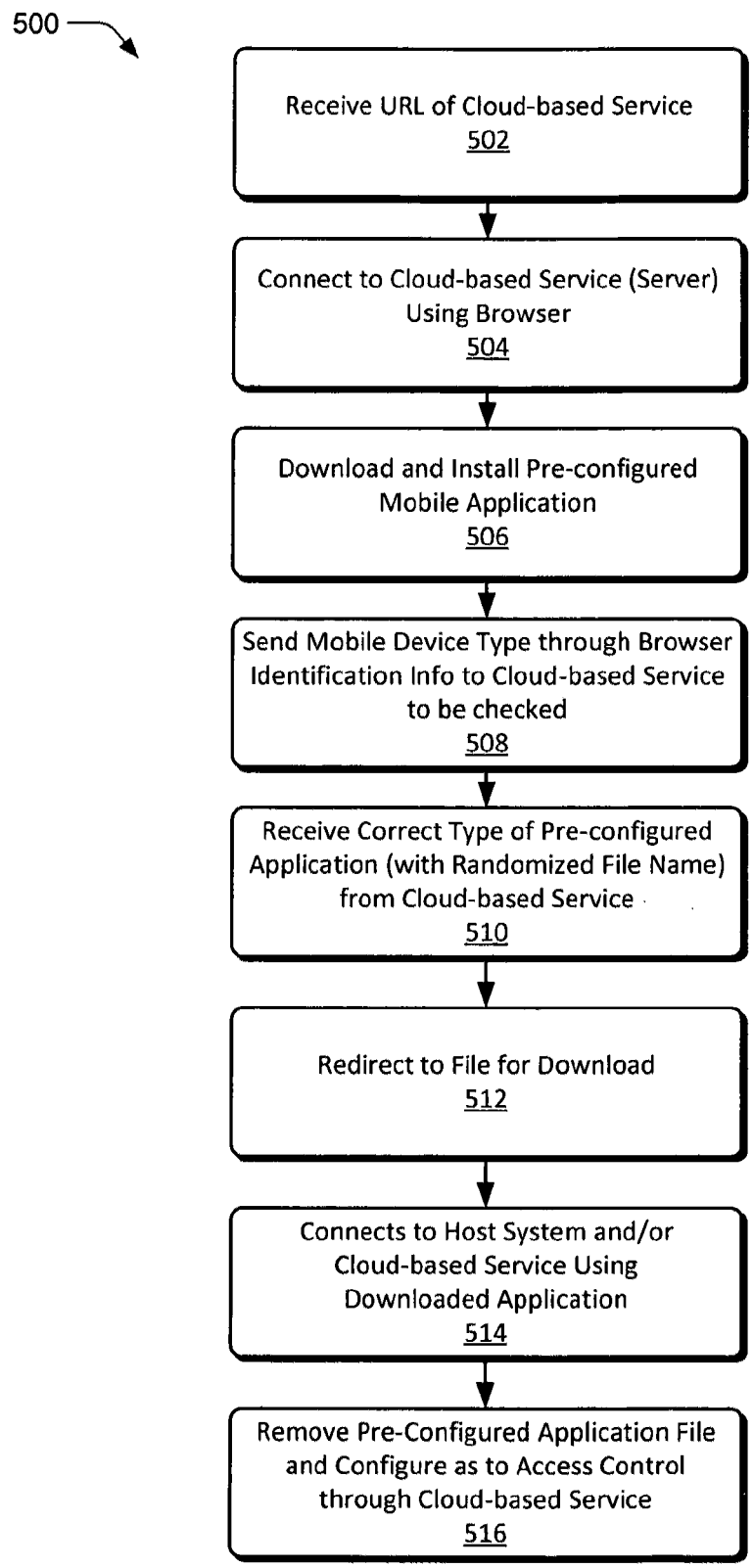
FIG. 5 is a flow chart for accessing and downloading applications for a mobile device according to some implementations.

FIG. 5 shows a flow chart for an exemplary process 500 for accessing and downloading applications for a mobile device from a cloud-based service according to some implementations. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, receiving a uniform resource locator or URL is performed. The URL may be received from host system that has developed a trust relationship with the cloud-based service. The receiving of the URL from the host system may be performed using one of various methods, including NFC and reading of a QR code. The receiving the URL can include a setup identification that may be communicated to the cloud-based URL.

At block 504, connecting to the cloud-based URL is performed. The connection may be performed using an Internet browser on the mobile device. Connecting can be performed through various wired and wireless connections available on the mobile device.

At block 506, downloading and installation of a pre-configured mobile application or applications is performed. The downloading is from the cloud-based service. Verification to download the application(s) can be made using the setup identification received from the host system.

At block 508, sending the mobile device type to the cloud-based service is performed. The sending may be performed using browser identification information. The cloud-based service may then check the browser identification information.

At block 510, receiving a correct type of pre-configured application from the cloud-based service. The pre-configured application may include a randomized file name to protect against unauthorized downloading.

At block 512, redirection to another URL may be performed. In the case that a file or files are not available at the current URL, redirection is performed to another URL. For example, the database 110 described above may have the file or files to be downloaded, and may have a different URL than the cloud-based service.

At block 514, connecting to the host system and/or the cloud-based service is performed. The connecting may be performed using the downloaded application. Communication between to the host system may be one of various wireless connections. Furthermore, connection to the cloud-based service may also implement a wireless connection. In certain implementations, in order to protect against attacks to the host system, the application can provide a WLAN profile, IP address and port and "secret" keys or data for decrypting a URL and/or client identifier or password.

At block 516, removing the pre-configured application file and configuring to access to the host system can be through the cloud-based service may be performed. The mobile device may authenticate with the cloud-based service at the URL with a client identifier and/or password.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the systems described could be configured as communication devices, computing devices, and other electronic devices.

What is claimed is:

1. A method performed by a device, of downloading an application from a cloud-based service comprising:
   establishing a local out of band connection between the device and a host system to establish security between the device and the host system;
   receiving a uniform resource locator (URL) and a setup identification from the host system;
   connecting to the cloud-based service through the URL;
   downloading and installing a pre-configured application from the cloud-based service using the received setup identification;
   sending a device type to the cloud based service;
   receiving a correct type of pre-configured application from the cloud-based service based upon the sent device type;
   redirection to another URL; and
   connecting to the host system and cloud-based service.

2. The method of claim 1, wherein a pre-existing trust relationship exists between the host system and the cloud-based service.

3. The method of claim 1, wherein the establishing a local connection includes performing out of band exchange of data using one or more of the following:
   NFC touch, infrared, 1-D or 2-D barcode, accelerometer bump, time-limited push-button configuration, and/or PIN number entry.

4. The method of claim 1, wherein the receiving the URL from the host system is through one of a quick response (QR) code that is read from the host system or near field communication (NFC) NDEF URL record.

5. The method of claim 4, wherein the URL is processed by a web browser of the device to enable downloading of the application.

6. The method of claim 1, wherein the downloading and installing the application includes verification of the setup identifier provided by the host system to the device.

7. The method of claim 1, wherein the redirecting to another URL includes receiving one or more applications from another cloud based service.

8. The method of claim 1 further comprising downloading security configuration from the cloud-based service.

9. The method of claim 1 further comprising confirming a second device to receive access rights to the host system.

10. The method of claim 1, wherein the method is performed by a mobile device.

11. A device comprising:
   one or more processors;
   a wireless interface coupled to the one or more processors, wherein the wireless interface is configured to connect through an out of band connection to establish security with a host system and to receive a uniform resource locator (URL) to a cloud-based service from the host system, a setup identifier, and a secret; and
   a memory coupled to the one or more processors and wireless interface to store the URL, the setup identifier, and secret, wherein the wireless interfaces uses the URL and the setup identifier to connect to the cloud-based service to download a pre-configured applications to be stored in the memory, wherein the wireless interface sends a device type to the cloud-based service to receive a correct type of pre-configured application based upon the device type, wherein after downloading the correct type of pre-configured applications, the wireless interface connects to the host system and the cloud-based service.

12. The device of claim 11, wherein the wireless interface includes a local channel that is an out of band channel.

13. The device of claim 11, further comprising one or more of the following: a near field reader and a quick response reader, and connection to the host system is performed using one of near field communication or quick response code, and wherein the receive from the host system is performed using one of near field communication (NFC) or quick response (QR) code.

14. The device of claim 11, wherein connecting to the cloud-based service is through an Internet connection.

15. The device of claim 11, wherein the download of one or more applications includes downloading security configuration.

16. The device of claim 11, wherein the host system is one of a personal computer, a set top box, a television, a mobile device, or a vehicle.

17. The device of claim 11, wherein the memory includes a web browser that reads the URL and is redirected to a different URL for downloading as instructed by the cloud-based service.

18. The device of claim 11, wherein the device is a mobile device.

19. One or more non-transitory computer-readable media having stored thereon computer executable instructions that, when executed, perform a method comprising:
   connecting locally through an out of band connection to a host system to establish security between the device and the host system;
   receiving a uniform resource locator to a cloud-based service from the host system after establishing security;
   connecting to the cloud-based service through the URL;
   downloading and installing a pre-configured applications through the cloud-based service;
   sending a device type to the cloud based service;
   receiving a correct type of pre-configured application from the cloud-based service based upon the sent device type;
   redirection to another URL; and
   connecting to the host system and the cloud-based service.

20. The computer-readable media of claim 19 further receiving secrets from the host system to establish trust between with the cloud-based service.

21. A device comprising:
   one or more processors;
   memory configured to the one or more processors, having instructions to:
   establish a local out of band connection to a host system to establish security between the device and the host system;
   receive one or more of the following from the host system after establishing security, through the local out of band connection: a uniform resource indicator to a cloud-based service, a setup identifier, and a secret;
   connect to the cloud-based service, to download one or more applications once connected to the cloud-based service;
   sending a device type to the cloud based service;
   receive another one or more applications based upon the sent device type;
   connect to the host system and the cloud-based service.

22. The device of claim 21, further comprising one or more of the following: a near field reader and a quick response reader, and the establish local connection is performed using one of near field communication or quick response code, and wherein the receive from the host system is performed using one of near field communication (NFC) or quick response (QR) code.

23. The device of claim 21, wherein the connect to the cloud-based service is through an Internet connection.

24. The mobile device of claim 21, wherein the download one or more applications includes downloading security configuration.

25. The mobile device of claim 21, wherein the host system is one of a personal computer, a set top box, a television, another mobile device, or a vehicle.

26. The mobile device of claim 21, wherein the memory includes a web browser that reads the URL and is redirected to a different URL for downloading as instructed by the cloud-based service.

27. A method performed by a host system to allow a device to download applications comprising:
   establishing trust with a cloud-based service;
   receiving a request to connect the device to the host system and/or connect the device to the cloud-based service;
   connecting through a local out of band connection to establish security between the device and host system;
   sending setup data to the cloud-based service to be sent to the device for use in downloading applications, the setup data includes sending of a device type to the cloud-based service after downloading the applications, wherein another application is downloaded based on the sent device type wherein the other application is used to connect the device to the host system and/or the cloud-based service.

28. The method of claim 27, wherein the establishing trust is performed during a manufacturing of the host system.

29. The method of claim 27, wherein the establishing the trust relationship includes digital certificates and hardware protection mechanisms implementing a secure boot process with software attestation and hardware-protected key storage, implemented by the host system to maintain integrity of the trust relationship.

30. The method of claim 27, wherein the sending includes sending a configuration and setup identification to the cloud-based system.

31. The method of claim 27, wherein the host system is a vehicle.

* * * * *